United States Patent
Mungas et al.

(10) Patent No.: US 8,230,673 B2
(45) Date of Patent: *Jul. 31, 2012

(54) ROCKET ENGINE INJECTORHEAD WITH FLASHBACK BARRIER

(75) Inventors: Gregory S. Mungas, Mojave, CA (US);
David J. Fisher, Tehachapi, CA (US);
Christopher Mungas, Plymouth, CA (US)

(73) Assignee: Firestar Engineering, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/613,188

(22) Filed: Nov. 5, 2009

(65) Prior Publication Data

US 2010/0275577 A1    Nov. 4, 2010

Related U.S. Application Data

(63) Continuation-in-part of application No. 11/950,174, filed on Dec. 4, 2007.

(60) Provisional application No. 60/868,523, filed on Dec. 4, 2006.

(51) Int. Cl.
*F16P 3/02* (2006.01)
*F16P 1/02* (2006.01)
*F02C 7/266* (2006.01)

(52) U.S. Cl. .................. 60/39.11; 60/39.827; 60/257

(58) Field of Classification Search .................. 60/257, 60/258, 39.827, 39.83, 206, 39.11
See application file for complete search history.

(56) References Cited

U.S. PATENT DOCUMENTS

| | | | |
|---|---|---|---|
| 1,061,847 | A | 5/1913 | Ionides, Jr. |
| 1,102,653 | A | 7/1914 | Goddard |
| 1,103,503 | A | 7/1914 | Goddard |
| 1,586,195 | A | 5/1926 | Hall |
| 2,609,281 | A | 9/1952 | Smith |
| 3,243,272 | A | 3/1966 | Schmitz |
| 3,512,556 | A | 5/1970 | McKhann |

(Continued)

FOREIGN PATENT DOCUMENTS

EP    1500880 A2    1/2005

(Continued)

OTHER PUBLICATIONS

International Searching Authority, International Search Report, PCT/US2011/021917, dated Mar. 14, 2011, 2 pages.

(Continued)

*Primary Examiner* — William H Rodriguez
*Assistant Examiner* — Young Choi
(74) *Attorney, Agent, or Firm* — HolzerIPLaw, PC

(57) ABSTRACT

Propellants flow through specialized mechanical hardware that is designed for effective and safe ignition and sustained combustion of the propellants. By integrating a micro-fluidic porous media element between a propellant feed source and the combustion chamber, an effective and reliable propellant injector head may be implemented that is capable of withstanding transient combustion and detonation waves that commonly occur during an ignition event. The micro-fluidic porous media element is of specified porosity or porosity gradient selected to be appropriate for a given propellant. Additionally the propellant injector head design integrates a spark ignition mechanism that withstands extremely hot running conditions without noticeable spark mechanism degradation.

13 Claims, 14 Drawing Sheets

U.S. PATENT DOCUMENTS

| | | | |
|---|---|---|---|
| 3,719,046 A * | 3/1973 | Sutherland et al. | 60/206 |
| 3,779,714 A | 12/1973 | Nadkarni et al. | |
| 4,045,159 A * | 8/1977 | Nishi et al. | 431/328 |
| 4,398,527 A | 8/1983 | Rynbrandt | |
| 4,446,351 A | 5/1984 | Kawaguchi et al. | |
| 4,458,595 A | 7/1984 | Gerrish, Jr. et al. | |
| 4,703,620 A | 11/1987 | Niino et al. | |
| 4,707,184 A | 11/1987 | Hashiguchi et al. | |
| 4,736,676 A | 4/1988 | Taylor | |
| 5,203,296 A | 4/1993 | Hart | |
| 5,305,726 A | 4/1994 | Scharman et al. | |
| 5,466,313 A | 11/1995 | Brede et al. | |
| 5,477,613 A | 12/1995 | Bales et al. | |
| 5,608,179 A | 3/1997 | Voecks et al. | |
| 5,738,061 A | 4/1998 | Kawamura | |
| 5,768,885 A | 6/1998 | Johnson et al. | |
| 5,855,827 A | 1/1999 | Bussing et al. | |
| 6,047,541 A | 4/2000 | Hampsten | |
| 6,151,887 A | 11/2000 | Haidn et al. | |
| 6,179,608 B1 | 1/2001 | Kraemer et al. | |
| 6,336,318 B1 * | 1/2002 | Falce et al. | 60/202 |
| 6,606,851 B1 | 8/2003 | Herdy, Jr. et al. | |
| 6,779,335 B2 | 8/2004 | Herdy, Jr. et al. | |
| 6,799,417 B2 | 10/2004 | Hewitt | |
| 6,834,504 B2 * | 12/2004 | Griffin et al. | 60/737 |
| 6,895,743 B1 | 5/2005 | McElheran et al. | |
| 6,896,512 B2 | 5/2005 | Rattner et al. | |
| 6,915,834 B2 | 7/2005 | Knott et al. | |
| 6,984,273 B1 | 1/2006 | Martin et al. | |
| 7,056,114 B2 | 6/2006 | Brooker | |
| 7,124,574 B2 | 10/2006 | Horn et al. | |
| 7,241,137 B2 * | 7/2007 | Leinemann et al. | 431/346 |
| 7,370,469 B2 | 5/2008 | Watkins | |
| 7,377,948 B2 | 5/2008 | Faris | |
| 7,418,814 B1 | 9/2008 | Greene | |
| 7,451,751 B2 | 11/2008 | Atherley | |
| 7,475,561 B2 | 1/2009 | Smolko et al. | |
| 7,585,381 B1 | 9/2009 | Zubrin | |
| 2004/0055277 A1 | 3/2004 | Kline et al. | |
| 2004/0081783 A1 * | 4/2004 | Prince | 428/36.9 |
| 2004/0253624 A1 * | 12/2004 | Smith et al. | 435/6 |
| 2006/0121080 A1 | 6/2006 | Lye et al. | |
| 2007/0169461 A1 | 7/2007 | Koerner | |
| 2008/0173020 A1 | 7/2008 | Mungas et al. | |
| 2008/0209872 A1 | 9/2008 | Samaras et al. | |
| 2009/0071434 A1 | 3/2009 | MacMillan et al. | |
| 2009/0120060 A1 * | 5/2009 | Coste | 60/257 |
| 2009/0126514 A1 * | 5/2009 | Burroughs et al. | 73/863.22 |
| 2009/0266049 A1 * | 10/2009 | Mittendorf | 60/204 |

FOREIGN PATENT DOCUMENTS

| | | |
|---|---|---|
| GB | 1029894 | 5/1996 |
| WO | 0151433 A1 | 7/2001 |
| WO | 03028069 A2 | 4/2003 |
| WO | 2004089564 A1 | 10/2004 |
| WO | 2005037467 A2 | 4/2005 |
| WO | 2007052084 A1 | 5/2007 |

OTHER PUBLICATIONS

International Searching Authority, Written Opinion, PCT/US2011/021917, dated Mar. 14, 2011, 7 pages.

"aRocket", an amateur rocketry discussion forum on http://exrocktry.net/mailman/listinfo/arocket, Dec. 31, 2009.

Balasubramanyam, M.S. et al., "Catalytic Ignition of Nitrous Oxide with Propane/Propylene Mixtures for Rocket Motors," 41st AIAA/ASME/SAE/ASEE Joint Propulsion Conference & Exhibit, Jul. 10-13, 2005, Tucson, AZ, AIAA Paper No. AIAA 2005-3919, pp. 1-8.

Boysan, M.E. et al., "Comparison of Different Aspect Ratio Cooling Channel Designs for a Liquid Propellant Rocket Engine," Recent Advances in Space Technologies, 2007, RAST '07, 3rd International Conference, pp. 225-230/.

Burkhardt, W.M. et al., Abstract—"Formed platelets for low cost regeneratively cooled rocket combustion chambers," AIAA, SAE, ASME, and ASEE, Joint Propulsion Conference and Exhibit, 28th, Nashville, TN, Jul. 6-8, 1992, SAO/NASA ADS Physics Abstract Service, http://adsabs.harvard.edu/abs/1992jpnt.confRT...B, 2 pages.

Dong (Keun) Kim et al., "Characterization/Modeling of Wire Screen Insulation for Deep-Water Pipes," Proceedings of the 2006 AIAA/ASME Joint Heat Transfer Conference, Jun. 5-8, 2006, San Francisco, CA, AIAA Paper No. AIAA-2006-3135, pp. 1-11.

Haack, David P. et al., "Novel Lightweight Metal Foam Heat Exchangers," http://fuelclellmarkets.com/content/images/articles/white_paper1.pdf, downloaded Jan. 11, 2011, 7 pages.

International Searching Authority, U.S. Patent and Trademark Office; International Search Report for PCT/US2007/086410; dated Oct. 1, 2008, 2 pages.

International Searching Authority, U.S. Patent and Trademark Office; International Search Report for PCT/US2008/083039; dated Mar. 24, 2009, 2 pages.

International Searching Authority, U.S. Patent and Trademark Office; International Search Report for PCT/US2009/067219, dated Aug. 6, 2010, 3 pages.

International Searching Authority, U.S. Patent and Trademark Office; International Search Report for PCT/US2010/041234, dated Sep. 3, 2010, 2 pages.

International Searching Authority, U.S. Patent and Trademark Office; International Search Report for PCT/US2010/041249, dated Sep. 7, 2010, 2 pages.

International Searching Authority, U.S. Patent and Trademark Office; International Search Report for PCT/US2010/041255, dated Sep. 14, 2010, 2 pages.

International Searching Authority, U.S. Patent and Trademark Office; International Search Report for PCT/US2010/041259, dated Nov. 23, 2010, 3 pages.

International Searching Authority, U.S. Patent and Trademark Office; Written Opinion for PCT/ US2007/086410; dated Oct. 1, 2008, 7 pages.

International Searching Authority, U.S. Patent and Trademark Office; Written Opinion for PCT/ US2008/083039; dated Mar. 24, 2009, 6 pages.

International Searching Authority, U.S. Patent and Trademark Office; Written Opinion for PCT/ US2010/041234, dated Sep. 3, 2010, 5 pages.

International Searching Authority, U.S. Patent and Trademark Office; Written Opinion for PCT/ US2010/041249, dated Sep. 7, 2010, 9 pages.

International Searching Authority, U.S. Patent and Trademark Office; Written Opinion for PCT/ US2010/041255, dated Sep. 14, 2010, 6 pages.

International Searching Authority, U.S. Patent and Trademark Office; Written Opinion for PCT/ US2010/041259, dated Nov. 23, 2010, 6 pages.

Kolb et al, "Micro-structured reactors for gas phase reactions," Chemical Engineering Journal (2004), vol. 98, pp. 1-38.

Mahjoob, Shadi et al., "A Synthesis of Fluid and Thermal Transport Models for Metal Foam Heat Exchangers," International Journal of Heat and Mass Transfer 51 (2008), pp. 3701-3711.

Marchi, Carlos Henrique et al., "Numerical Solutions of Flows in Rocket Engines with Regenerative Cooling," published in Numerical Heat Transfer, Part A: Applications, vol. 45, Issue 7, Apr. 2004, pp. 699-717.

Mungas, G. et al., "NOFB Monopropulsion System for Lunar Ascent Vehicle Utilizing Plug Nozzle Ascent Engine," The Johns Hopkins University, Chemical Propulsion information Analysis Center, 2008.

Naraghi, M.H. et al., Dual Regenerative Cooling Circuits for Liquid Rocket Engines (Preprint), 42nd AIAA/ASME/SAE/ASEE Joint Propulsion Conference & Exhibit, Jul. 9-12, 2006, Sacramento, CA, 18 pages.

Raffray, A.R. et al., "MERLOT: A Model for Flow and Heat Transfer through Porous Media for High Heat Flux Applications," Fusion Division, Center for Energy Research, University of California, San Diego, La Jolla, CA, Nov. 2001, 32 pages.

Raffray, A.R. et al., "Modeling Flow and Heat Transfer Through Porous Media for High Heat Flux Applications," University of California Energy Institute, Berkeley, CA, Oct. 2002, 19 pages.

Wikipedia, "Nitrous Oxide," http://en.wikipedia.org/wiki/Nitrous_oxide, retrieved Mar. 16, 2010.

Wikipedia, "Rocket engine," http://en.wikipedia.org/wiki/Rocket_engine, retrieved Jul. 21, 2009, 21 pages.

Wood et al., "Porous burners for lean-burn applications," Progress in Energy and Combustion Science (2008), vol. 34, pp. 667-684.

Yuan, K. et al., "Enhancement of Thrust Chamber Cooling with Porous Metal Inserts," 41st AIAA/ASME/SAE/ASEE Joint Propulsion Conference & Exhibit, Jul. 10-13, 2005, Tucson, TZ, 14 pages.

* cited by examiner

ROCKET ENGINE INJECTORHEAD WITH FLASHBACK BARRIER

CROSS-REFERENCE TO RELATED APPLICATIONS

The present application claims benefit of priority to U.S. Provisional Patent Application No. 60/868,523 entitled "Spark-Integrated Propellant Injector Head with Flashback Barrier" and filed on Dec. 4, 2006, specifically incorporated by reference herein for all that it discloses or teaches.

The present application is a continuation-in-part of U.S. patent application Ser. No. 11/950,174, entitled "Spark-Integrated Propellant Injector Head with Flashback Barrier", tiled on Dec. 4, 2007, and specifically incorporated by reference herein for all that it discloses or teaches.

This invention was supported in part by subcontract number 1265181 from the California Institute of Technology Jet Propulsion Laboratory/NASA. The U.S. Government may have certain rights in the invention.

BACKGROUND

Liquid fueled rockets have better specific impulse ($I_{sp}$) than solid rockets and are capable of being throttled, shut down and restarted. The primary performance advantage of liquid propellants is the oxidizer. The art of chemical rocket propulsion makes use of controlled release of chemically reacted or un-reacted fluids to achieve thrust in a desired direction. The thrust acts to change a body's linear or angular momentum. There are multiple methods for using liquid propellants to achieve thrust.

A monopropellant is a single fluid that serves as both a fuel and an oxidizer. Upon ignition of a monopropellant, a chemical reaction will occur yielding a mixture of hot gases. The ignition of a monopropellant can be induced with use of an appropriate catalyst, introduction of a high energy spark, or raising a localized volume beyond the reaction's activation energy. Monopropellant ignition causes an exothermic chemical reaction whereby the monopropellant is converted into hot exhaust products. A common example of a monopropellant is hydrazine, often used in spacecraft attitude control jets. Another example is HAN (hydroxyl ammonium nitrate). Another form of propellant is a bipropellant, which consists of two substances: a fuel and an oxidizer. Bipropellants are commonly used in liquid-propellant rocket engines. There are many examples of bipropellants, including RP-1 (a kerosene-containing mixture) and liquid oxygen (used in the Atlas rocket family) and liquid hydrogen and liquid oxygen (used in the Space Shuttle).

Chemically reacting monopropellants and pre-mixed bipropellants liberate chemical energy through thermal decomposition and/or combustion. This chemical energy release is initiated by a mechanism deposed within the combustion chamber (i.e., the chamber where a majority of chemical energy release occurs). Commonly, the initiation mechanism is incorporated in the vicinity of a combustion chamber's propellant injector head. The design and manufacture of a propellant injector head used in a combustion chamber is important to achieve effective and safe operation of the rocket thruster. If the design is not correct, flame can propagate back past the propellant injector head and into the propellant storage tank (known as flashback) causing a catastrophic system failure (i.e., an explosion).

SUMMARY

Implementations described and claimed herein address the foregoing issues with a propellant injector head that incorporates specific design criteria that allows it to be used effectively with monopropellants or mixed bipropellants. The propellant injector head provides thorough mixing of propellant fuel and oxidizers prior to injection into a combustion chamber. Furthermore, the propellant injector head provides a flame barrier to prevent flames or combustion waves from back-propagating into the propellant feed system including sustained combustion processes. In addition, the propellant injector head provides a novel configuration that integrates a regenerative fluid-cooled spark igniter into the rocket thruster assembly so as to protect the spark igniter (i.e., the electrode) from degradation due to the high temperatures from propellant combustion in the combustion chamber. The unique and novel propellant injector head design disclosed herein provides a substantial improvement in the art of rocket thrust technology, allowing use of a wide array of propellants for rocket propulsion. Moreover, similar to propellant injector heads and propellants that have found application in other gas generation, combustion processing, and power generation applications, the present technology may be utilized in these types of applications as well.

Certain implementations of the technology provide a combustion system comprising: a housing defining a cooling chamber and a combustion chamber separated by a flame barrier, wherein the cooling chamber is disposed around an electrode assembly, the flame barrier comprises fluid paths with a diameter of less than about 10 microns, and the electrode assembly comprises an interface sheath encompassing an insulating tube which encompasses an electrode; and a fuel inlet tube is disposed through the housing into the cooling chamber.

In yet other implementations, a combustion system is provided comprising: a housing defining a chamber having distal and proximal ends; the housing defining a cooling chamber at the proximal end, a combustion chamber at the distal end and a flame barrier between the cooling chamber and the combustion chamber; an electrode assembly disposed through the proximal end of the housing through the cooling chamber and through the flame barrier terminating at a surface of the flame barrier adjacent the combustion chamber, wherein the electrode assembly comprises an electrode disposed within an insulating tube, and wherein the insulating tube is disposed within an interface sheath; and a fuel inlet tube disposed through a side of the housing into the cooling chamber.

In yet other aspects, a combustion system is provided, wherein the interface sheath and the flame barrier comprise materials having similar coefficients of thermal expansion. In some aspects, the combustion system is provided wherein the interface sheath and the flame barrier comprise stainless steel alloys, pure nickel, nickel alloys, niobium, rhenium, molybdenum, tungsten, tantalum, tantalum alloys, sintered ceramic or laminate structures. In other aspects, the combustion chamber comprises an ablative or high temperature liner adjacent the housing, and in some aspects, the combustion chamber defines a throat constriction at the distal end of the housing.

In certain aspects of the combustion system, the electrode comprises a tip, single point, double point, triple point, quadruple point, star or split configuration. Also in some aspects, the combustion system further comprises a seal between the flash barrier, the cooling chamber and the housing. In aspects of the combustion system, the cooling chamber receives fuel via the inlet tube.

Yet other implementations of the technology provide a method for preventing flashback between a combustion chamber and a feed propellant and for providing regenerative cooling of an electrode assembly comprising: providing a propellant inlet into a cooling chamber, wherein the cooling chamber circumscribes the electrode assembly; providing a micro-fluidic flame barrier to separate the cooling chamber and a combustion chamber, wherein the micro-fluidic flame barrier comprises fluid paths having a diameter of about 5 microns or less; and running feed propellant through the fuel inlet, into the cooling chamber and through the flame barrier.

In some aspects of these implementations, the combustion system comprises a flame barrier comprises fluid paths having a diameter of about 250 microns, or less than about 150 microns, or less than about 100 microns, or less than about 70 microns, or less than about 50 microns, or less than about 20 microns or less than about 10 microns, or less than about 7 microns, or less than about 5 microns, or less than about 1 micron, or less than about 0.5 micron, or less than about 0.2 micron, or less than about 0.1 micron, or less than about 0.05 micron. In yet other aspects, such as those associated with atmospheric and low pressure applications, the flame barrier comprises fluid paths having a diameter of less than about 20 mm, or less than about 15 mm, or less than about 10 mm, or less than about 5 mm, or less than about 2.5 mm, or less than about 1 mm, or less than 0.5 mm, or less than about 0.25 mm. The preferred pore size is primarily dependent on the energy density of the propellant which is a function of both the specific energy (energy per unit mass) of the propellant and the fluid density (mass per unit volume) of the propellant which can vary from high density liquids to very low density gases.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
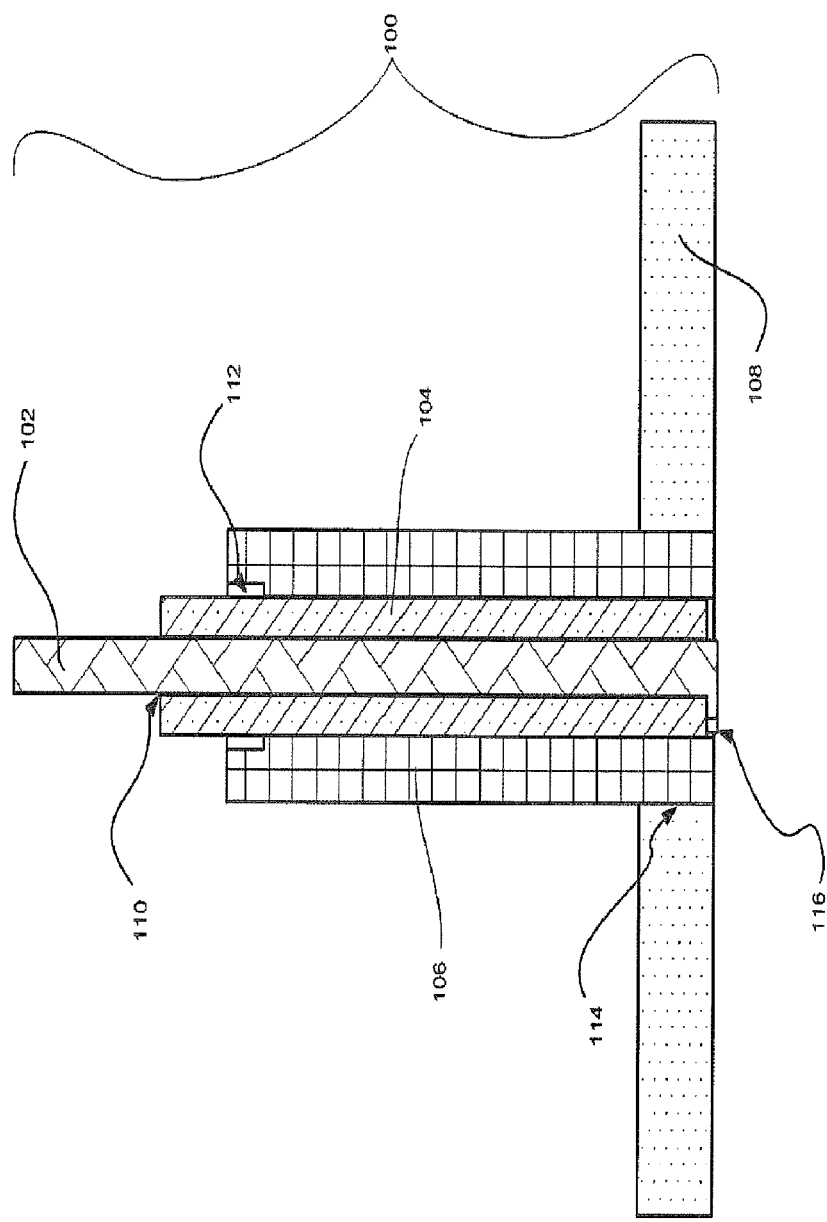
FIG. 1 is a longitudinal cutaway view of a propellant injector head according to the claimed invention.

Implementations described and claimed herein address the foregoing issues with a propellant injector head that incorporates specific design criteria that allows it to be used effectively with monopropellants or pre-mixed bipropellants. In addition, the propellant injector head provides a novel configuration that integrates a regenerative fluid-cooled spark igniter into the chemical reactor to protect the spark igniter (i.e., the electrode) from degradation due to the high temperatures from combustion in the combustion chamber. The unique and novel propellant injector head design disclosed herein provides a substantial improvement in the art of rocket propulsion allowing for use of a wide array of propellants, including those that combust at very high temperatures. Similar to propellant injector head and propellants that have found application in other working fluid production and power generation applications, the present technology may be utilized in these types of applications as well.

Before the present devices and methods are described, it is to be understood that the invention is not limited to the particular devices or methodologies described, as such, devices and methods may, of course, vary. It is also to be understood that the terminology used herein is for the purpose of describing particular embodiments only, and is not intended to limit the scope of the present invention; the scope should be limited only by the appended claims.

It should be noted that as used herein and in the appended claims, the singular fauns "a," "an," and "the" include plural referents unless the context clearly dictates otherwise. Thus, for example, reference to "a structure" refers to one structure or more than one structure, and reference to a method of manufacturing includes reference to equivalent steps and methods known to those skilled in the art, and so forth. "About" means plus or minus 10%, e.g., less than about 0.1 micron means less than 0.09 to 0.11 micron.

Unless defined otherwise, all technical and scientific terms used herein have the same meaning as commonly understood by one of ordinary skill in the art to which this invention belongs. All publications mentioned are incorporated herein by reference for the purpose of describing and disclosing devices, formulations and methodologies that are described in the publication and that may be used in connection with the claimed invention, including U.S. Ser. No. 12/268,266, filed Nov. 10, 2008, entitled "Nitrous Oxide Fuel Blend Monopropellant."

Where a range of values is provided, it is understood that each intervening value, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In the following description, numerous specific details are set forth to provide a more thorough understanding of the present invention. However, it will be apparent to one of skill in the art that the present invention may be practiced without one or more of these specific details. In other instances, well-known features and procedures well known to those skilled in the art have not been described in order to avoid obscuring the invention. The art of chemical rocket propulsion makes use of controlled release of chemically reacted or un-reacted fluids to achieve thrust in a desired direction. The thrust acts to change a body's (i.e., the rocket's) linear or angular momentum. Similar to propellant injector heads and propellants that have found application in other working fluid production and power generation applications, the claimed invention may be utilized in many alternative types of applications as well, including gas generation for inflation systems and inflatable deployments, in systems used to convert thermal energy in hot exhaust gases to mechanical and electrical power, and in high energy storage media for projectiles, munitions, and explosives. Examples where the claimed technology could be applied specifically include earth-orbiting spacecraft and missile propulsion systems; launch vehicle upper stage propulsion systems and booster stages; deep space probe propulsion and power systems; deep space spacecraft ascent and earth return stages; precision-controlled spacecraft station-keeping propulsion systems; human-rated reaction control propulsion systems; spacecraft lander descent propulsion, power, and pneumatic systems for excavation, spacecraft pneumatic science sample acquisition and handling systems; micro-spacecraft high performance propulsion systems; military divert and kill interceptors; high altitude aircraft engines, aircraft backup power systems; remote low temperature power systems (e.g., arctic power generators); combustion powered terrestrial tools including high temperature welding and cutting torches as well as reloadable charges for drive mechanisms (e.g., nail guns, anchor bolt guns), and the like. Moreover, there are many derivative applications related to using combustion stored energy and the delivery systems therefor.

In the case of many terrestrial combustion power applications (e.g., gas and diesel engines), the oxidizer is commonly atmospheric air which consists of oxygen that is highly reactive in the combustion reaction and relatively inert gases such as nitrogen. Bipropellants are either injected as separate fluids into a chemical reaction chamber or mixed immediately prior to injection (e.g., in carbureated or fuel-injected piston combustion engines).

FIG. 1 is a longitudinal cutaway view of various components of a propellant injector head 100 according to the claimed invention. Such a propellant injector head would be a component of a rocket thruster assembly Electrode 102, when sufficiently charged, induces a dielectric breakdown of uncombusted combustion fluids (propellant components). A tip 116 of electrode 102 is seen as well. The significance of tip 116 is discussed in detail infra. Surrounding the electrode 102, is a high temperature dielectric insulating tube 104. The function of the dielectric insulating tube 104 is to create a dielectric barrier between the electrode 102 and an interface sheath 106, necessary to control the location where a spark propagates between electrode 102 and the interface sheath 106. The combination of the electrode 102, dielectric barrier 104, interface sheath 106, electrical connector (not shown) and power supply (also not shown) comprises the spark ignition assembly. In addition, the interface sheath 106 aids in joining the electrode to a sintered and/or micro-fluidic flame barrier 108. Additionally, the interface sheath 106 shields the high voltage spark propagated from the electrode from inducing electromagnetic interference in other components of the rocket thruster. Gas tight interfaces 110 and 112 are created between the electrode 102 and the dielectric insulating tube 104 as well as between the dielectric insulating tube 104 and the interface sheath 106. A preferred implementation utilizes a brazed seal at gas tight interfaces 110 and 112; however, in some cases, a bonded interface may be used instead. The sintered and/or micro-fluidic flame barrier 108 comprises micro-fluidic passages to provide a fluid-permeable barrier between the combustion chamber and incoming combustion reactants. A junction 114 between the interface sheath 106 and the sintered and/or micro-fluidic flame barrier 108 may utilize an interference fit, a welded joint, a brazed joint, or a bonded joint depending on the materials employed, the nominal operating conditions, and the chemical reaction (propellant type) for which the propellant injector head is intended. Note the electrode 102, dielectric barrier 104, and interface sheath 106 (the "electrode assembly") of the spark ignition assembly is shown in an exemplary concentric configuration to the injector flame barrier 4. This exemplary concentric configuration is not necessarily required to be able to perform any of the functions described or claimed herein, as other configurations may be employed equally effectively.

Materials effective for use for the dielectric insulating tube 104 typically are high-temperature dielectric insulating ceramics. In some prototypes that which been tested, alumina was used, but other insulator materials also appropriate for the dielectric insulating tube include but are not limited to boron nitride, magnesium oxide, titanium nitride, titanium oxide, and beryllia. An additional consideration in the selection of materials for the dielectric insulating tube 104 is the thermal conductivity of the tube. Tubes with higher thermal conductivity aid in transferring heat from the electrode to the feed propellant keeping the electrode cooler (as discussed in detail, infra). Cooler electrodes tend to have longer service lives.

Figure 2:
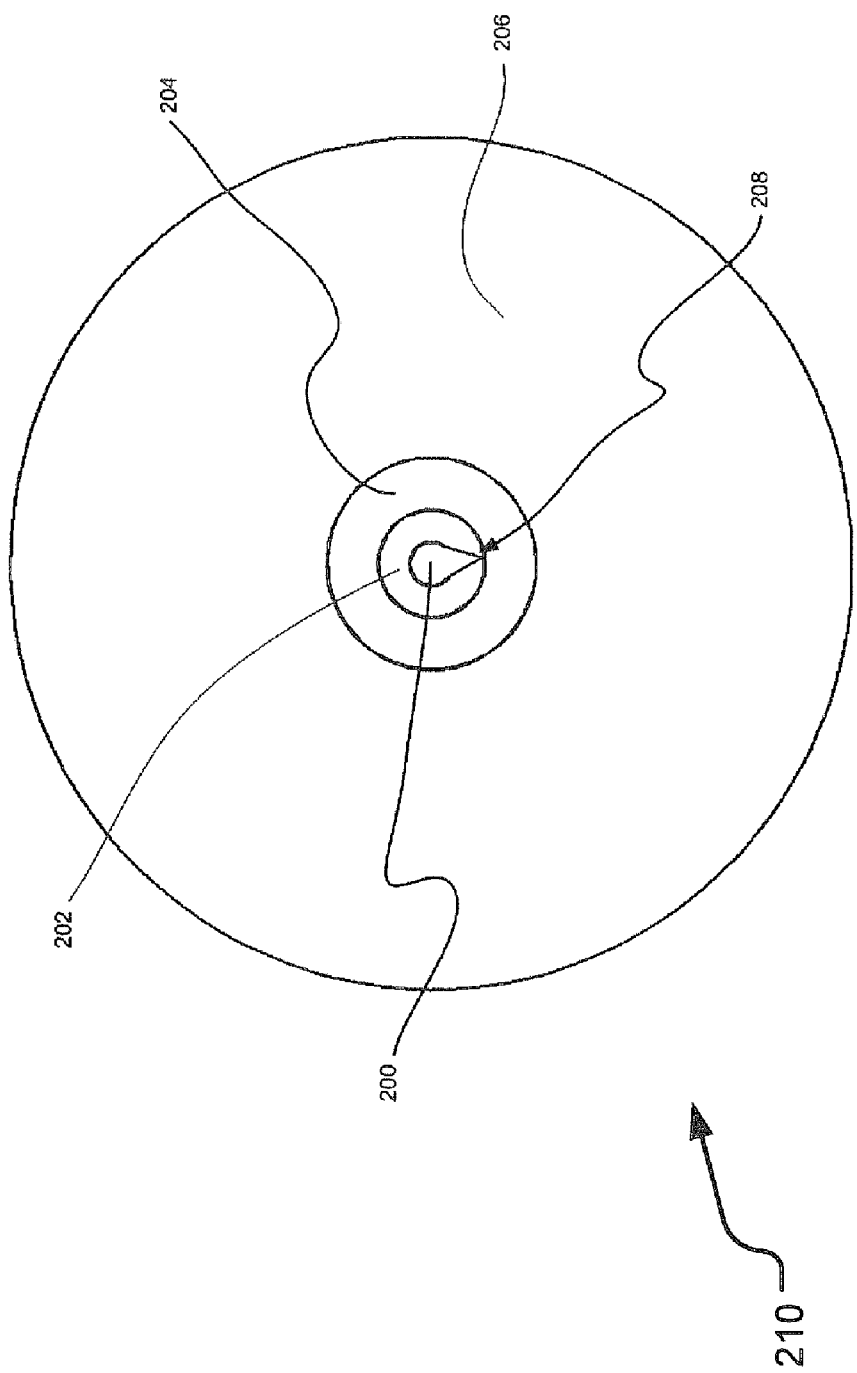
FIG. 2 is a frontal view of the propellant injector head as seen from inside a combustion chamber.

The interface sheath 106 serves in part to help cancel electromagnetic interference (EMI) generated by the spark ignition assembly and to mate with the sintered and/or micro-fluidic flame barrier 108. High power, pulsed, or high frequency sources can generate electromagnetic noise that can interfere with nearby electronics. Because electrical spark ignition often requires a high power, pulsed or high frequency current, minimizing the resultant EMI noise generated from this source from other electrical components may be desirable. Here, if the signal and return are constrained to a concentric electrically conductive geometry (e.g., the configuration of the electrode 102, the dielectric insulating tube 104, and the interface sheath 106 as shown in FIGS. 1 and 2), the electromagnetic noise that would be generated in the vicinity of the injector head can be significantly reduced. In general, the power supply for generating the high voltage pulses and the high voltage line connecting the power supply to the electrode 102 will also have their own similar EMI mitigation measures incorporated into their designs. Additionally, the material from which the interface sheath 106 is made must typically have a coefficient of thermal expansion (CTE) that is similar to the material of the sintered and/or micro-fluidic flame barrier 108.

Stresses at joint 114 induced by heating conditions commonly encountered in combustion applications may cause joint failure. Alternatively or in addition, if an interference fit is made with a sintered or micro-fluidic flame barrier comprising a material with a dissimilar CTE, a small gap may form at joint 114. A joint failure and/or release at 114 may lead to flame propagation around the sintered and/or micro-fluidic flame barrier causing the propellant injector head to fail in its intended purpose of preventing flame back-propagation back up the propellant feed system line to the propellant storage reservoir. This type of failure is commonly known as flashback and is described in more detail below. For this reason, the material used for the interface sheath 106 preferably either is the same as the sintered and/or micro-fluidic flame barrier 108, or, alternatively, the CTEs of the different materials used for these two components is closely matched based on the anticipated temperatures that the components will have to endure. For propellant injector heads of the claimed invention, a nickel 200 interface sheath 106 was used. Other materials that may be employed for the interface sheath 106 and the sintered and/or micro-fluidic flame barrier 108 may include, but are not limited to, various stainless steel alloys, pure nickel, various nickel alloys, niobium, rhenium, molybdenum, tungsten, tantalum, and alloys thereof. For the particular assembly shown, 5 micron media grade nickel 200 was utilized. Other propellant injector heads used with different propellants in different applications can utilize different materials. In some implementations, the flash barrier comprises fluid paths having a diameter of less than about 250 microns, or less than about 150 micron, or less than about 100 microns, or less than about 70 microns, or less than about 50 microns, or less than about 20 microns or less than about 10 microns, or less than about 7 microns, or less than about 5 microns, or less than about 1 micron, or less than about 0.5 micron, or less than about 0.2 micron, or less than about 0.1 micron, or less than about 0.05 micron. In yet other aspects, such as those associated with atmospheric and low pressure applications, the flame barrier comprises fluid paths having a diameter of less than about 20 mm, or less than about 15 mm, or less than about 10 mm, or less than about 5 mm, or less than about 2.5 mm, or less than about 1 mm, or less than 0.5 mm, or less than about 0.25 mm. The preferred pore size is primarily dependent on the energy density of the propellant which is a function of both the specific energy (energy per unit mass) of the propellant and the fluid density (mass per unit volume) of the propellant which can vary from high density liquids to very low density gases.

FIG. 2 is a frontal view of the propellant injector head as seen from the combustion chamber, showing sparker geometry and exemplary spark assembly placement. The electrode tip geometry and the material selection of the electrode 200 are important features. A sharp tip 208 is created on the electrode 200 on the combustion chamber side of the electrode 200, which serves to concentrate an electromagnetic field at tip 208 (tip 208 may also be seen in a different perspective in FIG. 1 at 116). Concentrated electromagnetic fields allow for generation of a voltage breakdown necessary for generating a spark. An arcing spark, if sufficiently energetic, will ignite a combustible fluid. The gap of the arc is commonly set to allow both minimum voltages to be applied in order to generate a spark and provide sufficient spark gap energy to initiate the combustion process. Every gas mixture has a different voltage breakdown curve (breakdown voltage versus variable, pd=mixture_pressure*gap_distance) that is dependent on combustible gas pressure, gap distance, and gap geometry. Therefore, gap distances and applied voltages to the electrode may vary depending on the combustible gas mixture and electrode tip geometry. In general, a wide array of electrode tip geometries (e.g., single point, double point, triple point, quadruple point, star pattern, split electrode, etc.), in addition to the exemplary tip geometry shown in FIG. 2, will produce electric fields necessary for generating a spark in a combustible mixture that is capable of initiating an exothermic combustion process. Also seen in FIG. 2 are the dielectric insulating tube 202, the interface sheath 204, and the sintered and/or micro-fluidic flame barrier 206.

Figure 4:
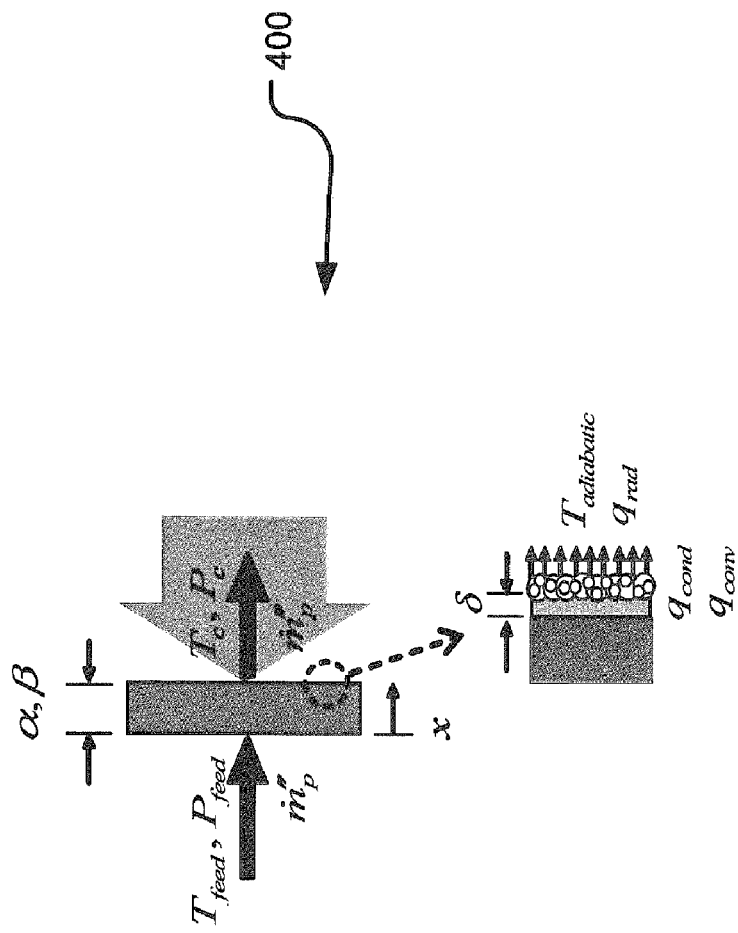
FIG. 4 is an illustration of geometry and parameters useful for understanding thermal distribution in a flame barrier and pressure drop across a flame barrier. $T_{adiabatic}$ is the flame temperature; $q_{rad}$, $q_{cond}$, $q_{conv}$ are the radiative, conductive, and convective heat fluxes respectively.

The sintered and/or micro-fluidic flame barrier (seen in FIG. 1 at 108) is designed to prevent flames and/or initial combustion (deflagration and/or detonation) waves from reaching the uncombusted propellant in a propellant feed system. Typically during ignition, combustion waves are generated that must be prevented from interacting with the uncombusted propellant in the propellant feed system which could cause a flashback. For relatively steady-state flow applications (i.e., rocket engine), after ignition, a relatively steady-state flame-front will form and reside downstream of the flame barrier (FIG. 4). In other processes (e.g., a piston engine) the flame-front may momentarily interact with the flame barrier at each combustion cycle in which case the flame barrier also acts as a thermal reservoir to absorb combustion thermal energy during this short duration interaction and dissipates the thermal energy into the next cycle's uncombusted inlet propellant during injection.

A very important parameter for designing the flame barrier 108 is the quenching distance of a monopropellant. This is the smallest flowpath dimension through which a flashback flame can propagate. Smaller flowpath sizes will quench a flame and, in general, prevent flashback. However, secondary ignition by heat transfer through a solid that is in contact with the unreacted monopropellant must also be ultimately considered (flame barrier thermal analysis is described below). In general, the higher the energy density of the propellant and/or combustible mixture, the smaller the quenching distance. In actual practice this dimension (here, approximately the diameter of a micro-fluidic flowpath) is affected by additional parameters such as tortuosity (curviness of flow path) and to a lesser extent the temperature of the solid containing the flowpath. The propellant energy density is described by Eq. 1:

$$\text{The Propellant\_Energy\_Density} = \text{Propellant\_Fluid\_Density} \times \text{Propellant\_Specific\_Energy} \quad (1)$$

Figure 3:
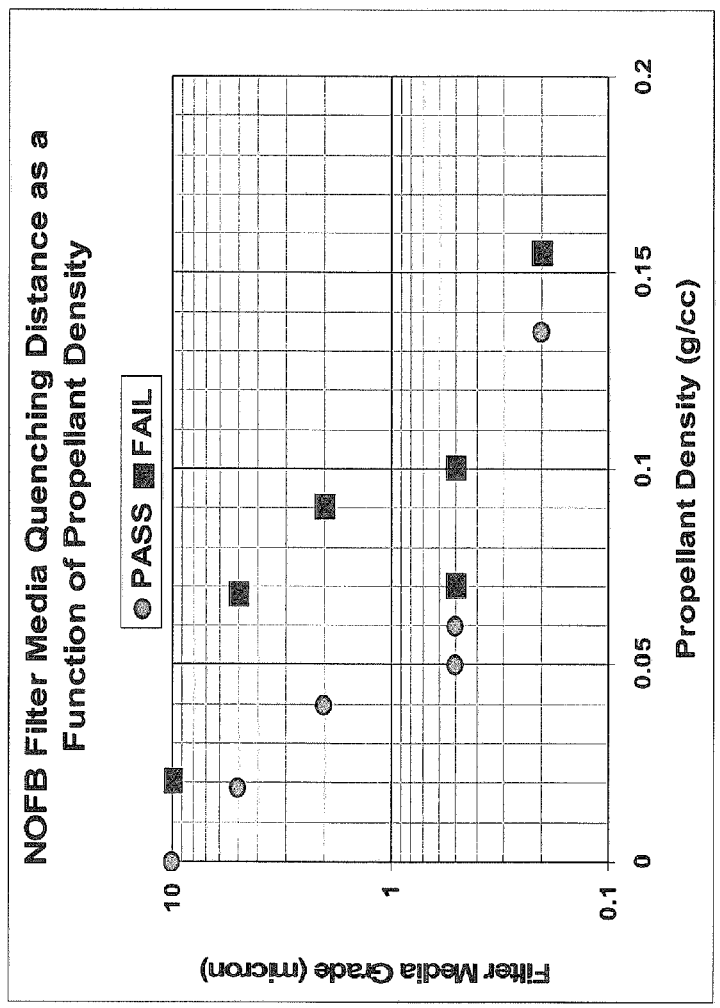
FIG. 3 illustrates the effective quenching distance for one exemplary combustible gas mixture of $N_2O$ and fuel versus the mixed propellant density. In this case, quenching distance is estimated experimentally from the media grade particle size above which the filter will not pass.

Some propellants have flame quenching distances on the order of microns and for very high fluid density (mass per unit volume), high propellant specific energy (energy per unit mass) propellants, these quenching distances can even be smaller. Quenching distances can be much larger (>mm) for low fluid density (i.e. low pressure combustible gases) and lower specific energy (e.g. hydrazine, hydrogen peroxide) propellants. FIG. 3 illustrates the highly non-linear but monotonically decreasing quenching distance with increasing propellant density of an exemplary combustible mixture. This figure demonstrates the wide range of quenching distances over a relatively narrow range of propellant energy density (in this case dominated by propellant fluid density).

The flame speed, or burn speed, is the speed at which the propellant is consumed. In general, the flamespeed of the burning propellant(s) must be greater than the flow velocity of the combustion gases inside a combustion chamber. If it is not, the flame will be "blown-out" of the combustion chamber, and the combustion reaction will not be sustained. However, flamespeeds (not to be confused with combustion wave or detonation wave velocity) of many combustible mixtures can be quite low (~10's cm/s to 10 m/s). As a result, in order to adequately slow down the propellant flow through the micro-fluidic porous media injectorhead into the combustion chamber to prevent "flame blow-out", a very large injectorhead may be required. Alternatively, in the design of the injectorhead, turbulent flow conditions for the injected propellant flow can be ensured over the operational mass flow rates that the injectorhead is expected to encounter. This injected turbulent flow has the effect of significantly augmenting the local flamespeed. As a result, in the region of turbulent flow downstream of the injectorhead, "Flame-holding" is feasible (see FIG. 4 region immediately downstream of δ). In many cases, the improvement in flamespeed can be a ~10× enhancement relative to the normal laminar flamespeed. The surface area of an injector designed to operate with turbulent flow can be scaled back in size by approximately the same gain in flame speed. As a result, injectorheads designed to operate under turbulent injected flow conditions can be expected to be significantly smaller in surface area than injectors designed to operate under very low speed laminar flow conditions. Operating under turbulent flow conditions (i.e. high mass flux) does cause increased pressure drop through the injectorhead. This increased pressure drop through a micro-fluidic porous media element can be mitigated, however, by the use of the advanced micro-fluidic porous media designs described in the paragraphs below. Turbulence is a complex fluid phenomenon by itself [Davies, J. T., *Turbulence Phenomena*. Academic Press. New York, 1972] which is augmented with a chemically reacting flow. Nevertheless, recent experimental research in combustion sciences has validated empirical models for estimating turbulent flamespeeds under a wide range of conditions [Lipatnikov, A. N., and Chomiak, J., *Turbulent flame speed and thickness: phenomenology, evaluation, and application in multi-dimensional simulations*. Progress in Energy and Combustion Science 28, pp 1-74 (2002).]. One such exemplary model derived from the Zimont model for turbulent flame speed [Lipatnikov, A. N., and Chomiak, J., *Turbulent flame speed and thickness: phenomenology, evaluation, and application in multi-dimensional simulations*. Progress in Energy and Combustion Science 28, pp 1-74 (2002).] and models for turbulence generated in pipe flow conditions is shown in Eq. 2.

$$U_t = 0.213 \rho_u^{-0.50} \mu_u^{-0.28} D^{-1.28} \dot{m}^{0.78} Pr_u^{0.25} S_{L,0}^{0.5} \quad (2)$$

where $U_t$ is the estimated turbulent flame speed; $\rho_u^{-0.50}$ is the unburned propellant's fluid density, $\mu_u^{-0.28}$ is the unburned propellant's dynamic viscosity, $D^{-1.28}$ is the pipe diameter, $\dot{m}^{0.78}$ is the mass flow rate of propellant, $Pr_u^{0.25}$ is the Prandtl number of the unburned propellant, and $S_{L,0}^{0.5}$ is the laminar flamespeed of the propellant. This equation allows one to design injectorheads that have nominally higher turbulent flamespeeds than propellant velocities going into a combustion chamber. In practice, given the complexity of turbulent flows, a particular design should be experimentally validated for its flameholding capability in addition to all of the other important performance metrics that would be desired for an injectorhead in a particular application (e.g. minimal pressure drop through the injectorhead, reasonable injectorhead temperatures that don't decompose the propellant prior to entry into the combustion chamber and/or fail the injectorhead materials, ability to filter out pressure instabilities, etc.).

FIG. 3 illustrates exemplary experimental data of sintered metal pore sizes sufficient for quenching a nitrous oxide and fuel bipropellant that has been mixed at propellant densities associated with ~50-500 psia combustible gas mixtures. Graph 300 shows that the quenching distance is a function of the propellant density in the pores, which in turn is dependent on the liquid/gas being used and the pressure and temperature distribution inside the micro-fluidic porous media flame barrier element. As pore sizes decrease in a flame barrier design, the pressure drop across a micro-fluidic porous media element will, in general, increase such that arbitrarily small pore sizes are not necessarily feasible (pressure drop analysis is described in more detail below). In the experiment from which this data is derived, a 1 foot×¼ in stainless steel line was loaded with premixed propellant with the sintered metal flame barrier on one end. The line was intentionally detonated. A combustible solid on the opposite side of the flame barrier was monitored to determine if a back-propagation through the flame barrier had occurred.

Drawing 400 in FIG. 4 illustrates flame barrier, flamefront, and propellant fluid parameters and geometry useful for understanding how quasi-steady-state combustion thermal interactions effect propellant pressure drop and internal flame barrier temperatures. α and β are viscosity and inertia flow coefficients, respectively, that are correlated with the flame barrier filter pore size and micro-fluidic fluid geometry and tortuosity.

During operation, the sintered media and/or micro-fluidic media flame barrier 108 (also seen at 804 of FIG. 8 and 900 of FIG. 9) cause(s) a fluid pressure drop. This pressure drop needs to be considered in the design of an upstream pressurant system. In general, the pressure drop mechanism in the propellant injector head also helps to filter out pressure oscillations associated with combustion instabilities in a combustion and/or chemical reaction chamber (820, 902) that could ultimately lead to catastrophic chamber failure. The propellant injector head is designed to accommodate a specific flow rate of propellant, differential pressure, and combustion chamber operating pressure. In general, the flow rate of propellant and operating pressure are commonly specified for a particular application. For example, by combining the mass flow of propellant and desired combustion chamber operating pressure with knowledge of the combustion chemistry and rocket nozzle design, it is possible to determine the output thrust a rocket engine will produce. In such a scenario, for a desired rocket engine thrust and nominal operating chamber pressure, the sintered media and/or micro-fluidic flame barrier (108, 804, 900) would be designed to provide a desired differential pressure drop for the prescribed mass flow rate of propellant. In combination with an upstream feed system pressurant design, this differential pressure drop would ensure that the desired combustion chamber pressure is achieved and/or maintained during operation. To adjust the differential pressure drop, the flame barrier thickness and cross-sectional area to the mass flow can be varied.

The pressure drop gradient (pressure drop per unit length that fluid traverses through injector medium) across the injector/flame barrier is related to the rate of propellant mass flux that passes through the flame barrier ($\vec{\dot{m}}''_p$ is the propellant mass flow rate per unit surface area), the fluid density of fluid traveling through the flame barrier (ρ), the propellant's dynamic viscosity (μ), and typically flame barrier fluid-interaction parameters, α and β. An exemplary mathematical expression that relates all of these injectorhead and propellant fluid parameters is:

$$\vec{\nabla}P = -\frac{\vec{m}_p''}{\rho}\left(\frac{\mu}{\alpha} + \frac{\dot{m}_p''}{\beta}\right) \quad (3)$$

In practice, particularly for two-phase (combination liquid and gas) flows, this relationship can be more complicated such that actual experimental measurements of pressure drop through the flame barrier versus mass flow rate under similar operating conditions as would be encountered in real application is a better technique for ultimately deriving flame barrier specifications. It is worth noting that since pressure drop is dependent on fluid density and temperature, and dynamic viscosity is dependent on temperature, combustion processes will, in general, influence the pressure drop through the flame barrier.

Figure 5:
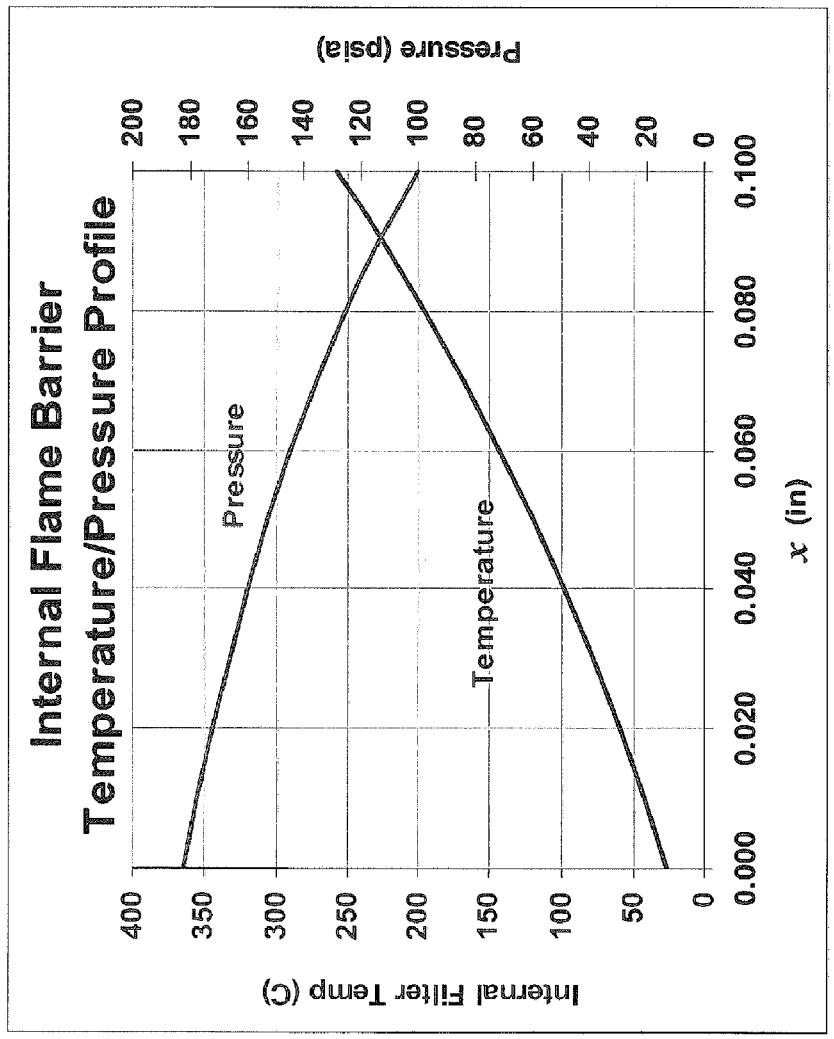
FIG. 5 is an illustration of internal flame barrier temperature and pressure drop through an exemplary porous media flame barrier exposed to a chamber heating surface heat flux.

Graph 500 in FIG. 5 illustrates an exemplary analysis (based on the pressure drop theory of diffusive flow as described above) of propellant temperature and pressure as propellant traverses through a porous media flame barrier with a radiative and convective heat flux on the combustion chamber face of the flame barrier.

Figure 6:
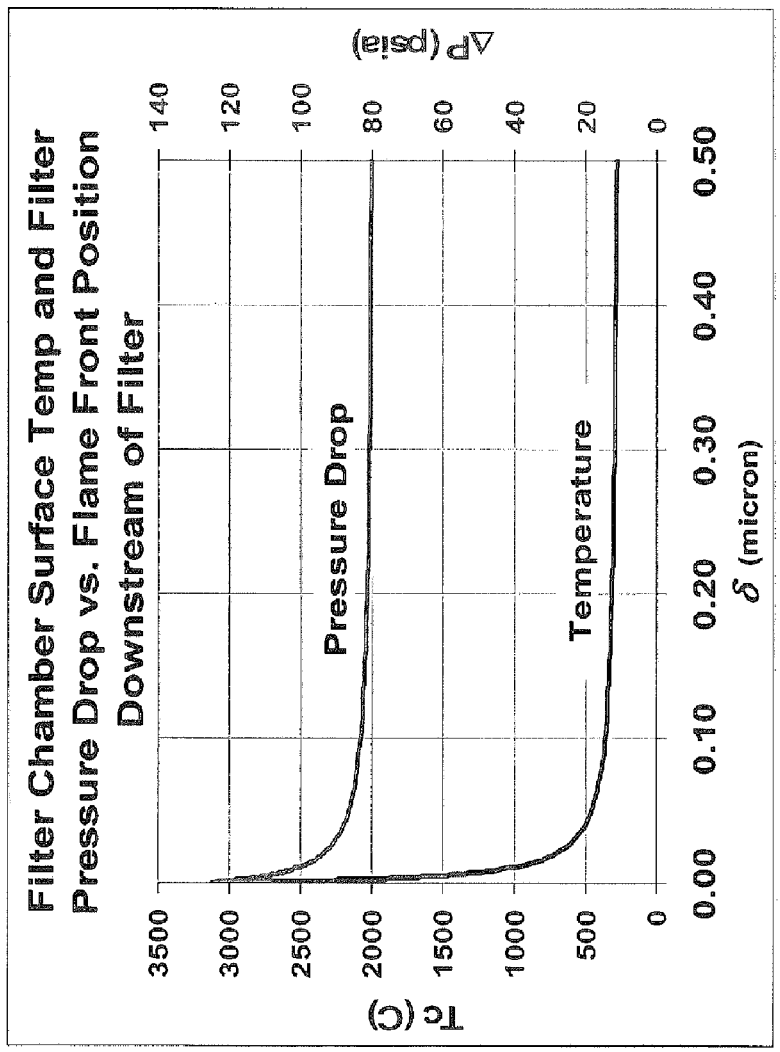
FIG. 6 is an illustration of analysis conducted to determine sensitivity of propellant pressure drop across the flame barrier and flame barrier combustion chamber face temperature as a function of flame-front position from the flame barrier face.

FIG. 6 illustrates the sensitivity of propellant fluid pressure drop across the flame barrier and surface temperature (chamber-side) of the flame barrier as a function of the location of the flame-front. As shown on graph 600, an exemplary propellant with an adiabatic flame temperature ($T_{adiabatic}$ is the maximum combustion temperature of a combusted propellant) of 3177° C. is analyzed using heat transport and thermophysical properties of the uncombusted and combusted exemplary propellant.

Figure 7:
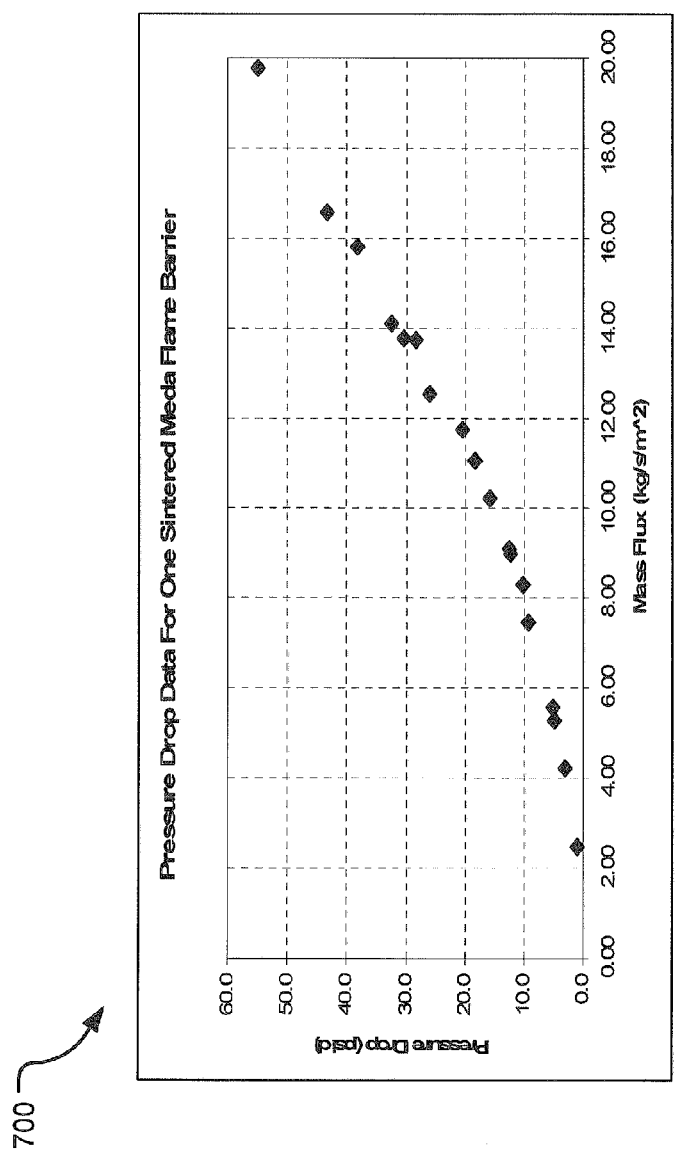
FIG. 7 is an illustration of experimental measurements of flame barrier pressure drop versus propellant mass flux.

FIG. 7 illustrates an example measurement of experimental pressure drop across a propellant injector head flame barrier. As a preliminary step in the injector head design process, it is often advantageous to define the flow characteristics of a flame barrier. The experiment that generated the graph 700 shown in FIG. 7 utilized a number of pressure transducers (electrical sensors used to measure fluid pressure) and mass flow measurements to determine both propellant mass flow rate and the pressure drop across a flame barrier. Mass flow rate is converted into a normalized mass flux by dividing the mass flow rate by the cross-sectional area of the exposed flame barrier. The resultant curve generated from this data can be used to size the cross-sectional area of a flame barrier for a given mass flow rate and desired differential pressure drop across the flame barrier, or alternatively can be used to estimate pressure drop for a given flame-barrier design for example.

Typical manufacturing methods for producing small fluid paths in a machined device (e.g., drilling, punching, etc.) for the most part are incapable of or are uneconomical for producing a viable propellant injector head to address the small required quenching distances. However, porous components, such as may be created by sintering pre-sorted media, can effectively create flow paths as small as 0.1 micron and smaller. In one implementation, sintered metal is produced by means of a powdered metallurgy process. The process involves mixing metal powder of a specific grain size with lubricants or additional alloys. After the mixture is complete, the mixed powder is compressed (e.g., an exemplary range of pressures is between about 30,000 lbs. and about 60,000 lbs or more per square inch) by machine to form a "compact", where typical compacting pressures are between 25 and 50 tons per square inch. Each compact is then "sintered" or heated in a furnace (e.g., to a temperature lower than the melting point of the base metal) for an extended period of time to be bonded metallurgically. In one implementation, the sintered metal contains micro-fluidic passages that are relatively consistent in composition, providing flow paths as small as 0.1 micron or less.

One propellant injector head prototype tested utilized a sintered metal filter as the flame barrier between the combustion chamber and the propellant inlet. However, other porous materials having micro-fluidic passages may be used in alternative designs including sintered ceramic filters and laminate structures. The propellant injector head design shown in FIG. 1 and described herein facilitates two major functions, namely, creation of a flame proof barrier and integration of a propellant spark-ignition mechanism. In the case of bipropellants or propellants with multiple constituents, however, the diffusive barrier can also provide a means for mixing propellant constituents very thoroughly prior to injection into a combustion or chemical reaction chamber by utilizing a highly tortuous network of micro-fluidic passages.

Figure 11:
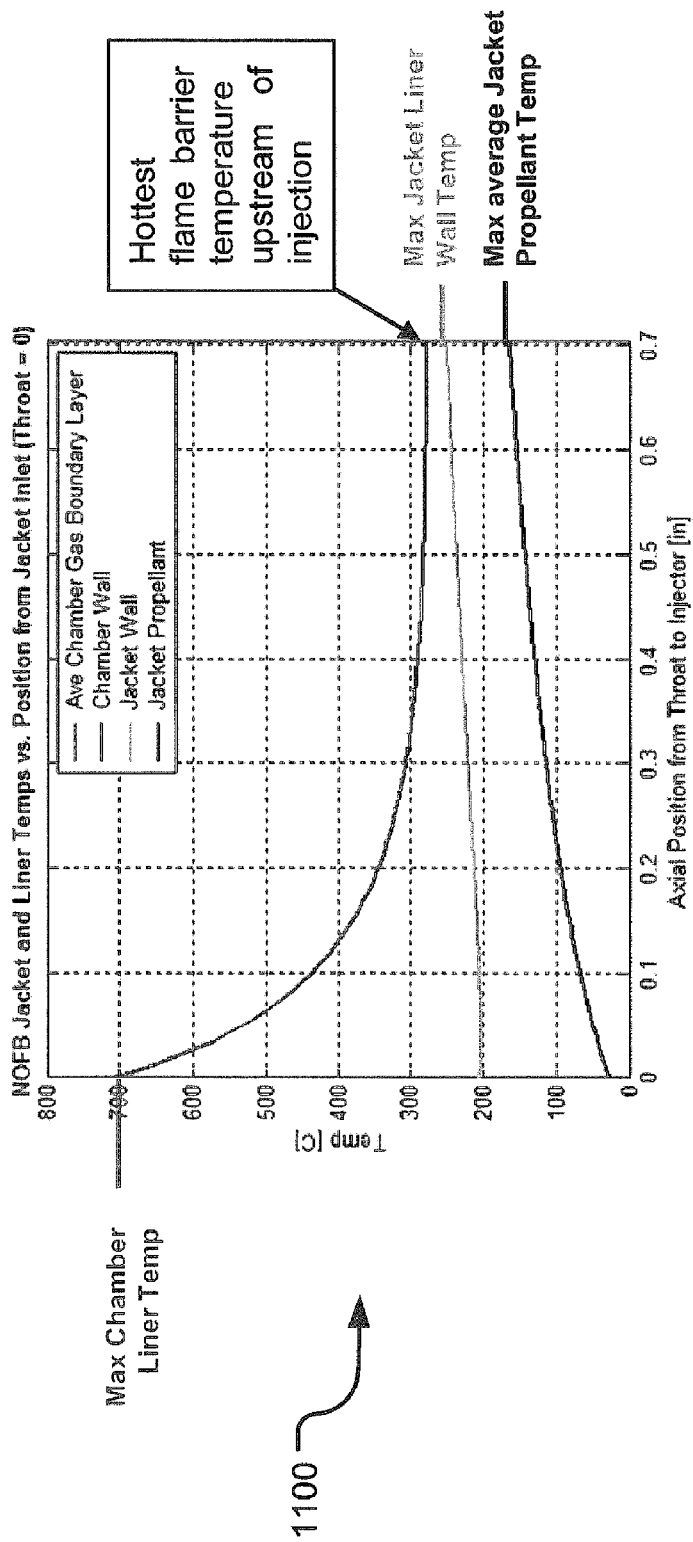
FIG. 11 is an illustration of exemplary thermal analysis predicting the propellant preheat temperatures that a regeneratively-cooled rocket thruster's propellant injector head may encounter.

In general, the combustion process generates very high temperatures. The geometries shown in drawing 830 of FIG. 8 and drawing 920 of FIG. 9 help mitigate electrode heating by utilizing the incoming combustible propellant as a regenerative (i.e., where thermal energy is not lost) coolant. Nevertheless, radiative, conductive, and convective heating of the electrode in a high temperature combustion chamber commonly results in temperatures that are higher than many conventional metals' operating limits. Furthermore, electrode life is generally longer with higher temperature electrode materials when exposed to high temperature chemical reaction and combustion processes. Thus, in some implementations, higher temperature electrode materials are used such as but not limited to refractory metals including tungsten, molybdenum, niobium, tantalum, rhenium, and alloys thereof. Niobium has been used effectively in numerous prototype propellant injector head prototypes and was used in the prototypes tested such as shown in FIG. 11. Niobium possesses a number of favorable attributes including a close CTE match with exemplary alumina electrical insulators which helps prevent tensile stresses (common failure mechanism in ceramics) from being generated in the interface sheath (seen at 104 in FIG. 1) under high temperature thermal loading, resistance to thermal shock, high ductility and high strength. The ductility is particularly attractive for fabrication processes that utilize cold working as a fundamental fabrication procedure. In one implementation, manufacturing comprised three primary steps. First, the end of a Niobium rod was flattened by mechanically deforming the tip. Second, the tip was bent to achieve a 90° bend. Finally, the excess material was removed to create a part dimensionally and geometrically similar to that shown in FIGS. 1 and 2. Alternative methods of manufacturing include machining (traditional or (electrical discharge machining), mechanical forming, sinter pressing, molding, casting, punching, welding (by electrode, e-beam or laser), or a combination thereof.

Figure 8:
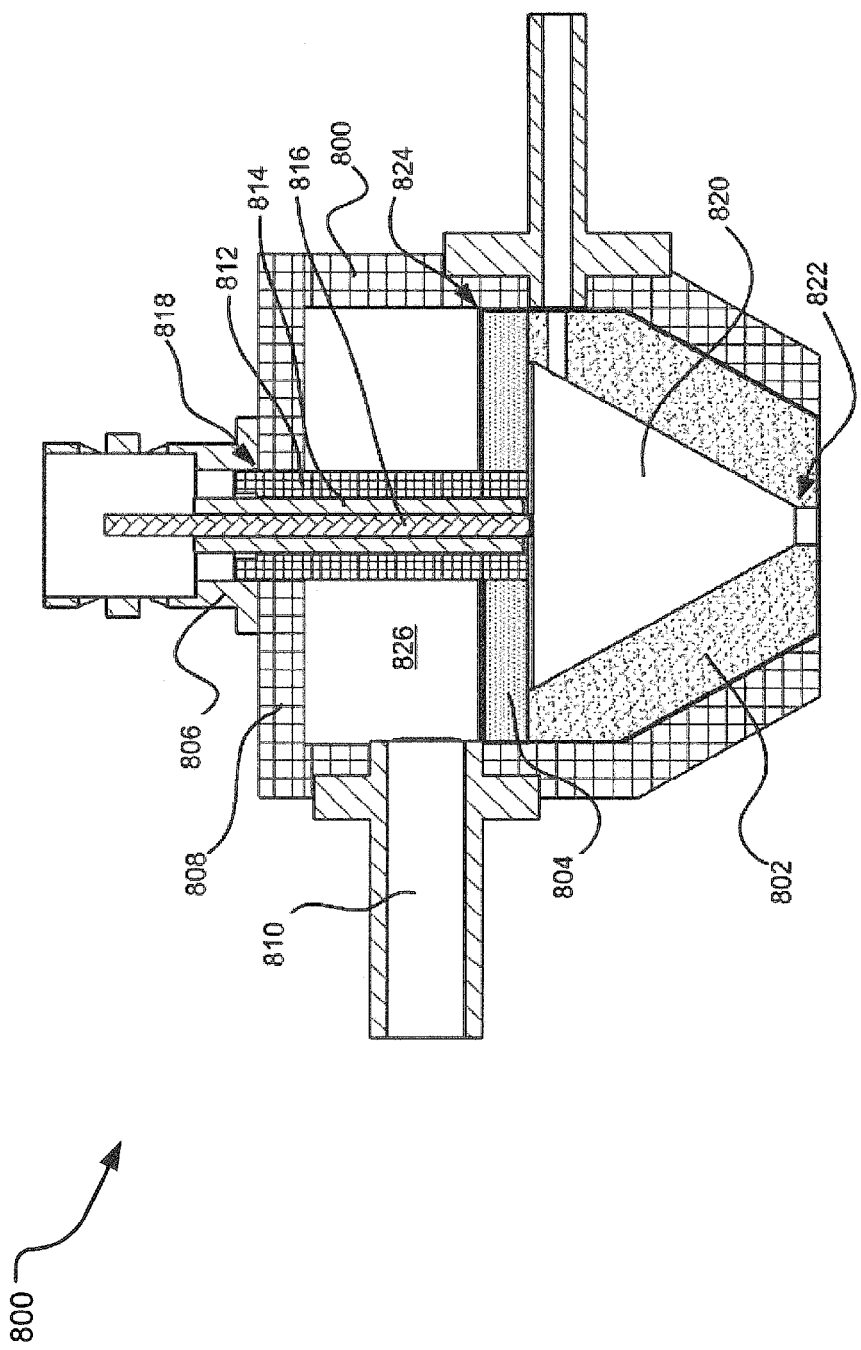
FIG. 8 is a longitudinal cutaway view of the disclosed propellant injector head integrated into a prototype rocket thruster with a high temperature liner.

FIG. 8 is a longitudinal cutaway view of a ceramic-lined rocket thruster to demonstrate an exemplary configuration of the propellant injector head as a component of the rocket thruster. In this implementation, combustor reactants enter through a propellant inlet tube 810, enter a cooling chamber 826, travel through the sintered and/or micro-fluidic flame barrier 804, ignite within the combustion chamber 820, travel through an ablative liner 802, and exit through the thrust throat constriction 822. Between the propellant inlet tube 810 and the sintered and/or micro-fluidic flame barrier 804, the un-reacted propellant flows into a cooling chamber 826 that provides cooling to the propellant injector head (the combination of components comprising electrode 816, dielectric insulating tube 814, interface sheath 812, and sintered and/or micro-fluidic flame barrier 804 as described in the detailed description of FIGS. 1 and 2). Recall that a seal is created 824 at the junction of the sintered and/or micro-fluidic flame barrier 804 with the thruster case 800. Seal 824 can be created by welding, brazing, bonding, or mechanical interference. An additional seal 818 is created at the junction of the thruster body cap 808 to the interface sheath 812. Depending on application and material choice, seal 818 can be made by a braze joint, weld joint, mechanical interference fit, or bonded joint. However, as discussed previously, the use of proper seals is imperative in proper propellant injector head function in many implementations. Improper integration of the propellant injector head assembly into a rocket thruster (e.g., improper fit or faulty seals) can pose a substantial safety risk. Prototypes built and used tested successfully have utilized a combination press/brazed flame barrier outer seal 824, and a brazed interface shield/thruster body cap seal 818. Note also in this cross sectional view are the dielectric insulating tube 814 and the electrode 816. A BNC (Bayonet Neil-Concelman)-type electrical connector 806 is an exemplary common electrical connector that may be used to interface a high voltage line to the electrode 816 and facilitate current delivery from and current return to a high voltage power supply.

Another feature of the propellant injector head of the claimed invention is the integration of an actively cooled spark ignition mechanism. Some of the particular monopropellants for which the integrated propellant injector head was created combust at an extremely hot temperature (around 3200° C.). Therefore, placing conventional sparking mechanisms (i.e., electrodes) in the combustion chamber would result in melting of nearly any electrode material. However, because the electrode and surrounding dielectric insulating tube and interface sheath are cooled (e.g., by incoming fluid delivered by the propellant inlet tube 810 and cooling chamber 826 of FIG. 8), very hot exothermic combustion reactions may be sustained without degrading the sparking mechanism.

Figure 9:
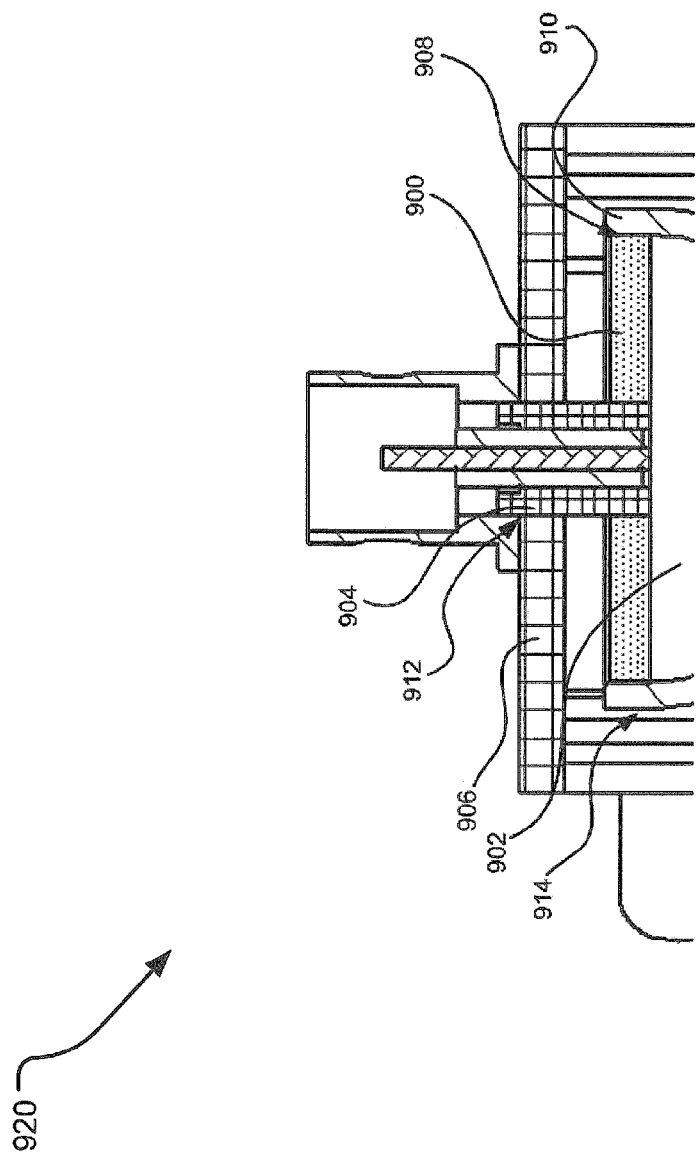
FIG. 9 is a longitudinal cutaway view of the disclosed propellant injector head integrated into a sophisticated regeneratively-cooled rocket thruster.

FIG. 9 is a longitudinal cutaway view of a regenerative cooled rocket thruster truncated slightly below the combustion chamber to demonstrate additional features. In this implementation, the combustion reactants encounter the propellant injector head via an annular regenerative cooling pathway 914 which cools the combustion chamber, flame-barrier joint 908, and the electrode assembly portion of the spark ignition assembly. The combustion reactants then pass through the sintered and/or micro-fluidic flame barrier 900, and are ignited within the combustion chamber 902. The propellant injector head assembly is configured as outlined in the detailed descriptions of FIG. 1 and FIG. 2. The sintered and/or micro-fluidic flame barrier 900 is sealed 908 directly to the combustion chamber walls 910. Depending on application and material choice, seal 908 can be made by braze joint, weld joint, mechanical interference fit, or bonded joint. An additional seal 912 is created at the junction of the interface sheath 904 and the thruster body cap 906. Depending on the application of the propellant injector head and material choice, seal 912 can be made by braze joint, weld joint, mechanical interference fit, or bonded joint. One implementation used in testing prototypes of fuel infector heads of the claimed invention successfully employed a mechanical interference for the outer flame barrier seal 908, and a brazed interference sheath/thruster body seal 912.

Figure 10:
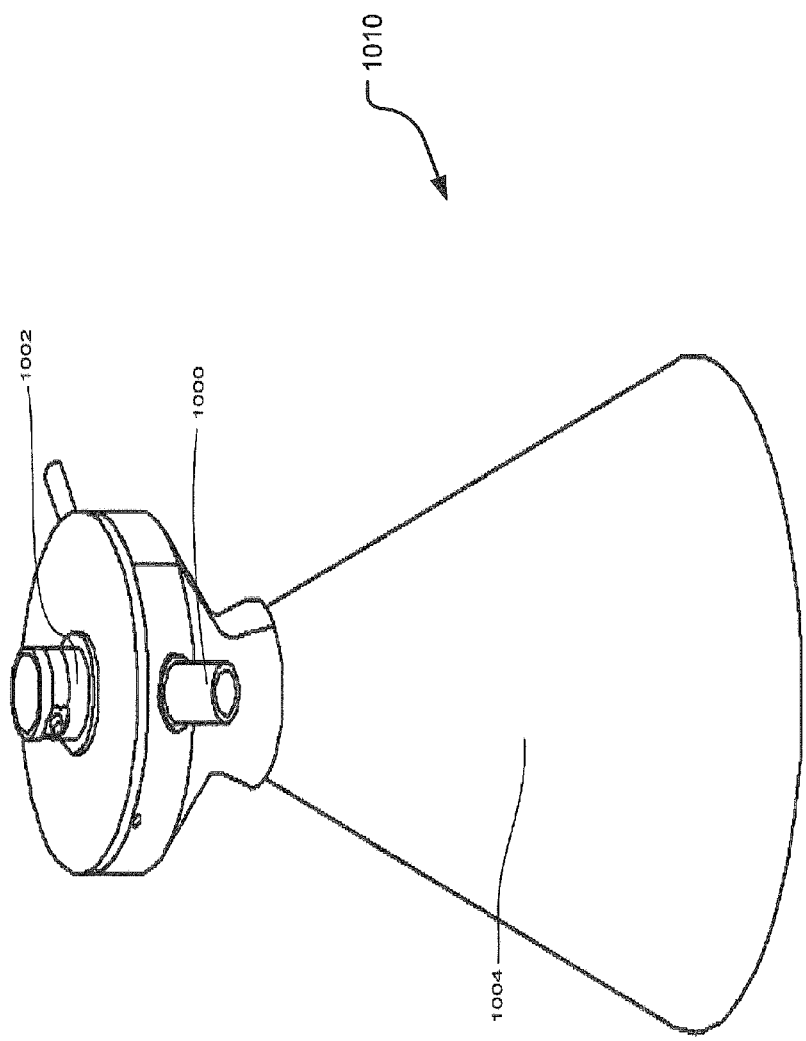
FIG. 10 is an isometric view of a regeneratively-cooled rocket thruster that utilizes the disclosed propellant injector head.

FIG. 10 illustrates a drawing 1006 of an isometric view of a regenerative cooled rocket thruster. Combustion reactants enter through the propellant inlet tube 1000, pass through the propellant injector head as shown in FIG. 1 and FIG. 8, are ignited via a spark pulse delivered to the BNC connector 1002, and exit through an exit cone 1004. Other possible configurations for the combustion chamber include, but are not limited to, refractory metal combustion chambers, regeneratively cooled chambers, ceramic chambers, or any combination thereof.

For purposes of helping define the temperature extremes that a flame barrier and its bonded joints must endure, graph 1100 of FIG. 11 illustrates exemplary thermal analysis of the regeneratively cooled engine (FIGS. 9 and 10). In this case, the temperature of the uncombusted propellant is analyzed from the injection into a combustion chamber cooling jacket to the point where the flame barrier is attached to the combustion liner wall 908. An engine with a high temperature liner (FIG. 8) has a flame barrier temperature that has been previously analyzed in FIG. 5. The maximum filter temperature of the regeneratively cooled engine is approximately the sum of the max jacket preheated propellant temperature shown in FIG. 11 and the maximum temperature modeled in FIG. 5. In the exemplary analysis for the regeneratively cooled engine concept, the maximum flame barrier temperature would, therefore, be <600° C. for a flame-front that resides >1 micron from the flame barrier chamber surface.

Propellant injector head design must consider many factors, such as, but not limited to, flame quenching distances, pressure drop variation due to propellant heating in the flame barrier, mechanical loading on a hot porous structure (e.g., pressure loads on the heated injector face), loss of mechanical strength due to heating, possible sintering of micro-fluidic passageways and pores where the propellant injection speeds into the chamber are low enough to allow the flamefront to stabilize too close to the flame barrier surface (see FIG. 4 and FIG. 6).

Furthermore, propellant injector head design must also factor in the material selection and fabrication steps necessary for providing high temperature reliable bonds at the locations described infra. To verify that high temperature bonding processes would not significantly alter or cause a sintered and/or micro-fluidic flame barrier to fail, a series of experiments were performed on sintered metal filters with various pore sizes.

Figure 12:
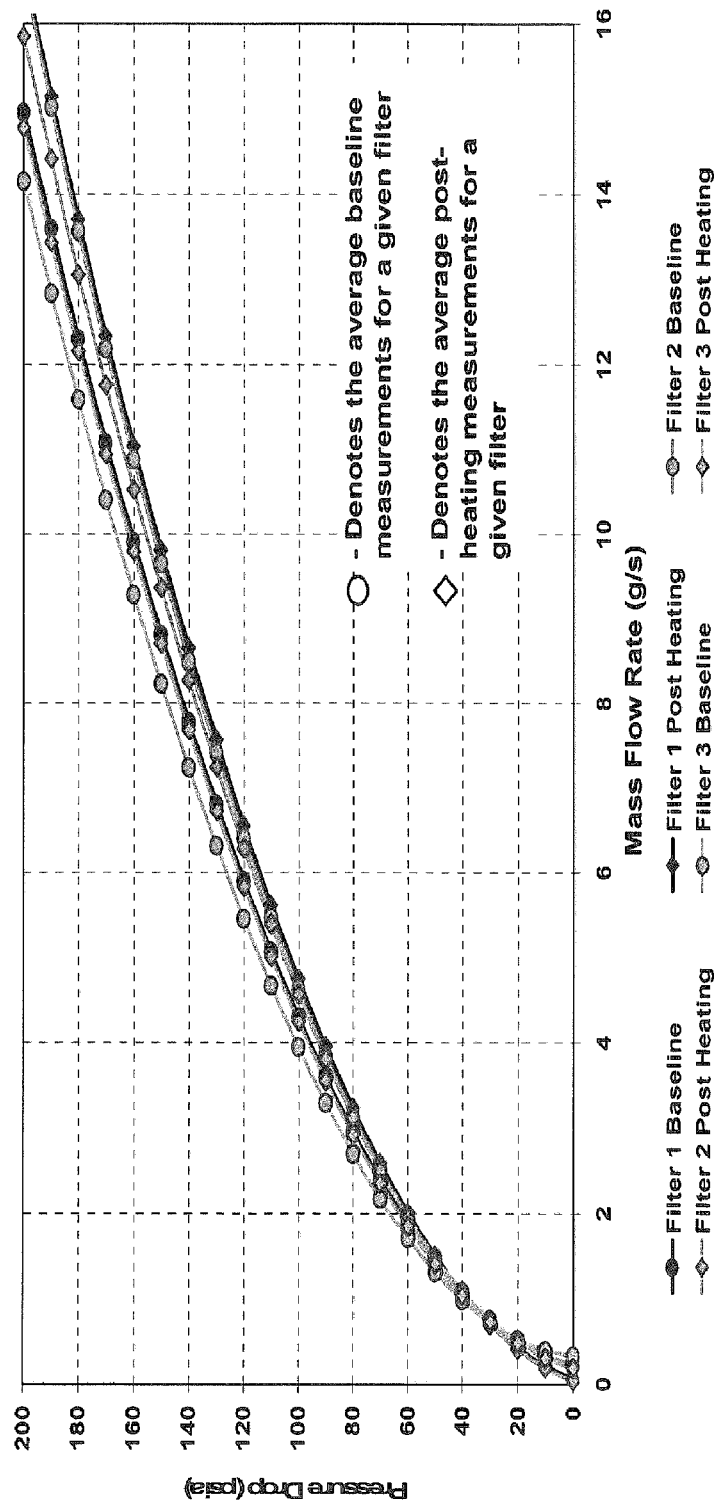
FIG. 12 is an illustration of pressure drop versus propellant mass flow rates before and after a filter has been subjected to oven heating at three different temperatures of 500° C., 750° C., and 1000° C.

FIG. 12 illustrates graph 1200 of experimental data of sintered metal filters exposed to oven heating to temperatures that may be encountered in actual operation or during high temperature bonding processes. In this experiment a sintered metal filter's pressure drop versus mass flow rate was measured before and after a filter had been heated to determine if there was any significant changes in the micro-fluidic structure based on global pressure drop estimate properties. Oven heating temperatures cases of 500° C., 750° C. and 1000° C. were tested. As can be seen, very little permanent changes occurred to the filter. Furthermore, these temperatures are significantly higher than the internal filter temperatures estimated previously using the theoretical analysis (described above) for the specific case where the flame-front can be controlled to be >1 micron from the flame-barrier surface.

In some combustion or chemical reaction chamber scenarios, chamber pressures can potentially be quite high (e.g., 100's to >1000 psia). Furthermore, high mass flow rates and pulsed combustor operation can cause large pressure gradients to exist across an injector head. If the injector head does not have sufficient mechanical strength, the porous structure may open under tensile loading and a subsequent failure resulting in a flashback can occur. For this reason it is important to ensure that the worst-case pressure loading in operation can not cause an injector head mechanical failure. A flame barrier's resistance to pressure loading can be estimated by measuring the tensile stresses that filter materials can endure prior to failure and measuring the modulus of elasticity of the material (measure of deflection of material under an applied load).

Figure 13:
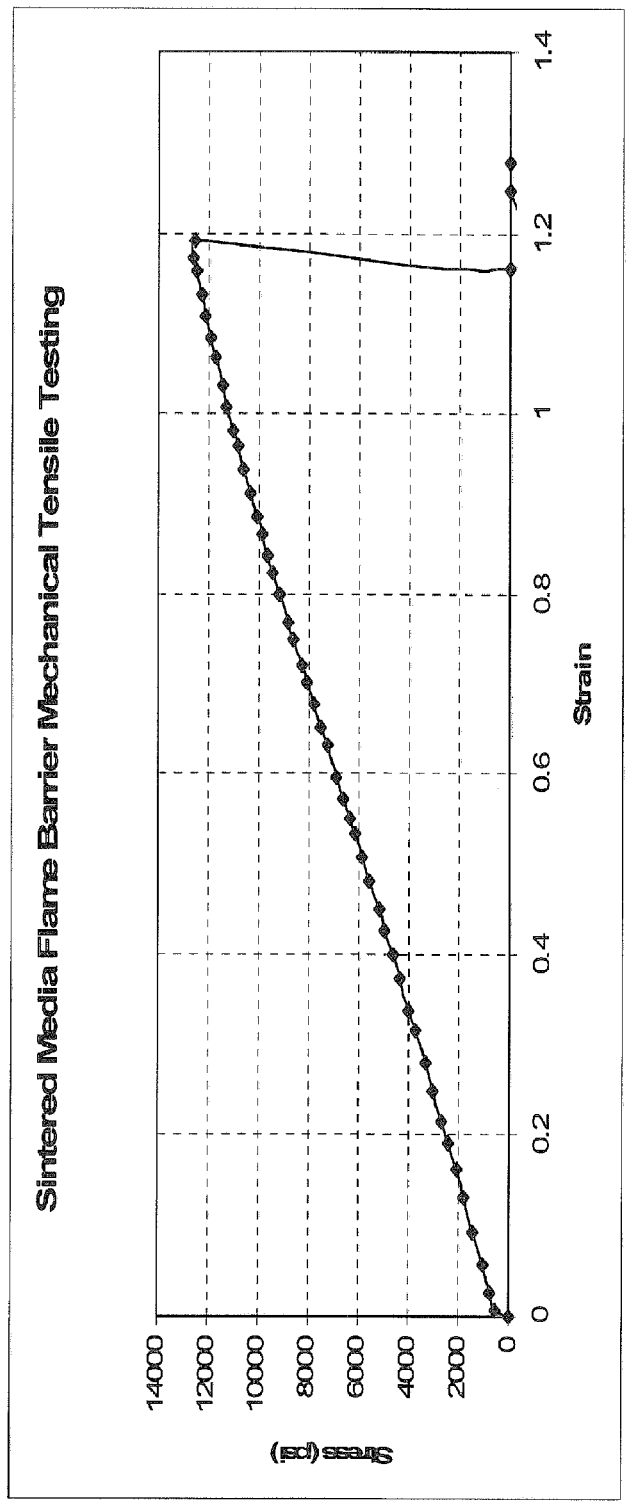
FIG. 13 is experimental tensile testing data of one sintered media flame barrier.

FIG. 13 demonstrates tensile test data for a sintered metal flame barrier. The graph 1300 shows sintered metal, in this case nickel 200, failed at ~12500 psi. Compared to the published base metal's tensile strength of 67000 psi, a lower tensile strength of roughly 5.4 times is observed. This lower tensile strength of the sintered metal may be accommodated with greater flame barrier thickness than would normally be required with a pure metal such as nickel 200. The slope of this curve is the modulus of elasticity.

Figure 14:
FIG. 14 is an illustration of the propellant injector head integrated into a monopropellant rocket engine application undergoing testing and verification.

FIG. 14 illustrates a photograph 1400 of the use of the designs shown in FIGS. 9 and 10 in an actual monopropellant engine. Long duration pulses were run to verify that there is no variation in the flame barrier pressure drop characteristics as the result of exposure to high combustion chamber temperatures and pressures. Forensic analysis of the engine propellant injector head after testing by machining the engine down into a cross-sectional view as shown in FIG. 9 indicated no observable thermal alteration of the flame barrier or spark ignition mechanism.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

In some applications, the quenching distances of a propellant may be sufficiently small such that very large pressure drop could ensue by having the micro-fluidic porous media not only be responsible for combustion wave quenching, but also sustaining combustion pressures. To address this issue, alternative embodiments of the injectorhead may include various forms of low fluid pressure drop backing structures on which a thinner flame barrier membrane is connected. The flame barrier is primarily responsible for flame quenching, and the additional backing structure is responsible for supporting the thin flame barrier against combustion chamber pressure loads. In another embodiment, a relatively thin micro-fluidic flame barrier membrane may be bonded onto a relatively stout structure that ensures the membrane is essentially fully "wetted" by the propellant and that the pressure stresses on the flame barrier will not fail the flame barrier. These are two exemplary architectural methods for achieving a thin flame barrier integrated into a stronger backing structure. Other embodiments may include, without limitation, combinations of these two techniques and alternative techniques such as fabricating an entire micro-fluidic porous media structure that incorporates macrofluidic passageways.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A combustion system comprising:
    a housing defining a chamber having distal and proximal ends; the housing defining a cooling chamber at the proximal end, a combustion chamber at the distal end and a flame barrier between the cooling chamber and the combustion chamber;
    an electrode assembly disposed through the proximal end of the housing through the cooling chamber and through the flame barrier terminating at a surface of the flame barrier adjacent the combustion chamber, wherein the electrode assembly comprises an electrode disposed within an insulating tube, and wherein the insulating tube is disposed within an interface sheath; and
    a fuel inlet tube disposed through a side of the housing into the cooling chamber, wherein the flame barrier comprises fluid paths having a diameter of less than about 0.1 micron, wherein the fluid paths are adapted to prevent combustion from propagating through the flame barrier.

2. The combustion system of claim 1 wherein the flame barrier comprises fluid paths having a diameter of less than about 0.05 micron.

3. The combustion system of claim 2 wherein the flame barrier comprises fluid paths having a diameter of less than about 0.02 micron.

4. A combustion system comprising:
    a housing defining a chamber having distal and proximal ends; the housing defining a cooling chamber at the proximal end, a combustion chamber at the distal end and a flame barrier between the cooling chamber and the combustion chamber;
    an electrode assembly disposed through the proximal end of the housing through the cooling chamber and through the flame barrier terminating at a surface of the flame barrier adjacent the combustion chamber, wherein the electrode assembly comprises an electrode disposed within an insulating tube, and wherein the insulating tube is disposed within an interface sheath; and
    a fuel inlet tube disposed through a side of the housing into the cooling chamber, wherein the flame barrier comprises fluid paths having a diameter of less than about 500 microns, wherein the fluid paths are adapted to prevent combustion from propagating through the flame barrier.

5. The combustion system of claim 4 wherein the flame barrier comprises fluid paths having a diameter of less than about 200 microns.

6. The combustion system of claim 5 wherein the flame barrier comprises fluid paths having a diameter of less than about 100 microns.

7. The combustion system of claim 6 wherein the flame barrier comprises fluid paths having a diameter of less than about 50 microns.

8. The combustion system of claim 7 wherein the flame barrier comprises fluid paths having a diameter of less than about 20 microns.

9. The combustion system of claim 8 wherein the flame barrier comprises fluid paths having a diameter of less than about 10 microns.

10. The combustion system of claim 9 wherein the flame barrier comprises fluid paths having a diameter of less than about 5 microns.

11. The combustion system of claim 10 wherein the flame barrier comprises fluid paths having a diameter of less than about 2 micron.

12. The combustion system of claim 1, wherein the cooling chamber is adapted to cool the electrode assembly.

13. The combustion system of claim 4, wherein the cooling chamber is adapted to cool the electrode assembly.

* * * * *